United States Patent [19]

Stadt et al.

[11] Patent Number: 4,699,022
[45] Date of Patent: Oct. 13, 1987

[54] PLANETARY GEAR CONTROL SYSTEM WITH RETARDER

[75] Inventors: Enno Stadt, Heidenheim; Friedrick Helfer, Koenigsbronn-Zang, both of Fed. Rep. of Germany

[73] Assignee: J.M. Voith, GmbH., Heidenheim, Fed. Rep. of Germany

[21] Appl. No.: 852,372

[22] Filed: Apr. 16, 1986

Related U.S. Application Data

[63] Continuation of Ser. No. 439,402, Nov. 5, 1982, abandoned.

[51] Int. Cl.$^4$ .......................... F16H 3/44; B60K 29/02
[52] U.S. Cl. ........................................ 74/782; 74/793; 74/846; 192/4 B
[58] Field of Search ............ 74/782, 783, 846, 752 A, 74/752 C, 752 D, 793, 760, 761; 192/4 A, 12 B

[56] References Cited

U.S. PATENT DOCUMENTS

| | | | |
|---|---|---|---|
| 2,339,015 | 1/1944 | Jandasek | 74/781 R X |
| 2,341,512 | 2/1944 | Burtnett | 74/752 C |
| 2,343,509 | 3/1944 | Jandasek | 74/782 |
| 2,365,879 | 12/1944 | Jandasek | 74/688 |
| 2,397,634 | 4/1946 | Voytech | 74/781 R X |
| 2,924,992 | 2/1960 | Edsall | 74/688 |
| 2,996,932 | 8/1961 | Gsching | 74/781 R X |
| 3,075,410 | 1/1963 | Weinrich et al. | 74/752 C X |
| 3,091,980 | 6/1963 | Black | 74/752 C |
| 3,105,393 | 10/1963 | Weinrich | 192/4 A X |
| 3,204,487 | 9/1965 | Moore | 74/782 X |
| 3,481,148 | 12/1969 | Muller et al. | 60/54 |
| 3,601,211 | 8/1971 | Finke | 180/6.66 |
| 3,709,069 | 1/1973 | Hagen | 192/4 A X |
| 3,749,209 | 7/1973 | Weinrich et al. | 188/291 |
| 3,818,782 | 6/1974 | Armasow | 74/782 X |
| 3,941,224 | 3/1976 | Hanke | 192/4 B X |
| 4,077,502 | 3/1978 | Nitsche | 192/4 B |
| 4,089,239 | 5/1978 | Murakami et al. | 74/761 |
| 4,169,414 | 10/1979 | Muller | 105/61 |
| 4,191,072 | 3/1980 | Ehrlinger et al. | 74/732 |
| 4,257,504 | 3/1981 | Hanke | 192/12 A |
| 4,273,224 | 6/1981 | Brown et al. | 192/4 A |
| 4,361,211 | 11/1982 | Lindenthal | 188/296 |
| 4,432,442 | 2/1984 | Vogelsang | 192/4 B X |
| 4,440,272 | 4/1984 | Bieber | 192/4 B X |
| 4,471,668 | 9/1984 | Elsner | 74/687 X |
| 4,471,670 | 9/1984 | Muller | 74/731 |

FOREIGN PATENT DOCUMENTS 2935361  3/1981  Fed. Rep. of Germany .

Primary Examiner—Leslie Braun
Assistant Examiner—Joseph M. Rolnicki
Attorney, Agent, or Firm—St. Onge Steward Johnston & Reens

[57] ABSTRACT

A planetary gear system employs a retarder to provide fluid coupling of power during startup and fluid braking during deceleration. At idle with the output shaft stationary, an input shaft rotates in one direction and the retarder rotates in the opposite traction. When the retarder is activated by adding working fluid, the resultant torque coupled to the output shaft rotates the output shaft in the same direction as the input shaft. The retarder rotor can be mechanically braked to produce a first mechanical gear. Further coupling rotates the input shaft, output shaft and retarder rotor at the same speed in the same direction to form a second mechanical gear. Hydrodynamic braking can be performed in the second mechanical gear by adding working fluid to the retarder. A control system is disclosed which varies the level of working fluid during acceleration to a value which permits the input shaft to rotate at a required value regardless of the acceleration input signal. In addition, acceleration can be controlled proportionally to the output shaft speed. At a predetermined value of output speed, the retarder is automatically drained in order to take advantage of mechanical gearing. During braking, the level of fluid in the retarder is varied to provide a braking torque proportional to the braking signal.

13 Claims, 5 Drawing Figures

PLANETARY GEAR CONTROL SYSTEM WITH RETARDER

This is a continuation of co-pending application Ser. No. 439,402, filed on Nov. 5, 1982, now abandoned.

BACKGROUND OF THE INVENTION

The present invention relates to a drive unit with a planetary gear system and a hydrodynamic retarder. The retarder is used for power transmission during acceleration at low speed and during deceleration.

Smooth starting and stopping of a vehicle are enhanced by fluid coupling between input and output. However, the efficiency of fluid coupling is relatively low. It is thus desirable to switch out or inactivate the fluid coupling when running speed is achieved. One type of fluid coupling is a retarder which is a type of hydrodynamic brake.

German laid-open Patent Specification No. 1,480,506 discloses an apparatus for driving a zero-shaft in the steering system of a tracked vehicle. This apparatus includes planetary gears and a retarder. The retarder can be connected into the planetary gear system to decelerate one of the gear elements which rotates faster than an input gear element and thereby to couple torque to an output in a direction opposite to that of the first-mentioned gear element.

German laid-open Patent Specification No. 2,021,543 discloses a vehicle gear system including an integrated hydrodynamic torque converter which can be used for traction, particularly for starting, and for hydrodynamic braking. Although this system operates satisfactorily, it requires a large number of planetary wheel sets to accomplish a given number of gear ratios.

German laid-open Patent Specification No. 2,656,669 discloses a vehicle gear system having both a hydrodynamic torque converter, intended purely for traction operation, and a retarder, which is used only for hydrodynamic braking. The need for both types of apparatus makes the cost of such a gear relatively high.

Both of the above gear systems incur hydraulic losses in the hydrodynamic power transmission especially during startup.

German Offenlegenschrift No. 2,935,361 discloses a gear system which has a mechanical, so-called continuous and gear-switching brake, which is designed for longer periods of slip operation. Slip operation is provided similarly to a retarder for starting up from a standstill and for braking the vehicle. Despite the fact that the brake is constructed for longer periods of slip operation, the danger of wear and/or overheating remains. It is, therefore, not used in practice. Moreover, it is not acceptable to replace the continuous brake in the known gear system by a retarder, since coupling the continuous braking rotor to a slowly-rotating gear component provided therein would be very unfavorable for the retarder.

U.S. Pat. No. 2,343,509 discloses a gear system which has a retarder, a planetary gear system and a through-coupling. The through-coupling is a free-wheeling one-way coupling. When initially starting from a standstill, the input shaft, the output shaft and the retarder rotor have the same rotary speed and the same direction of rotation. Thus, the retarder can become effective only after reaching a certain minimum rotary speed. The output shaft then rotates faster than the input shaft. The retarder in this patent is not useful in the important start-up speed range. Retarder braking is not disclosed.

German patent No. 2,618,073 discloses an electrohydrodynamic drive unit which has a torque converter and a reversing gear for traction operation.

German patent No. 1,600,191 and German published Patent Specification No. 3,000,664 disclose retarders adapted for bi-directional rotation with high specific output in both directions.

OBJECTS AND SUMMARY OF THE INVENTION

Accordingly, it is an object of the present invention to provide a power transmission which overcomes the drawbacks of the prior art.

It is a further object of the invention to provide a power transmission employing hydrodynamic transmission during starting and braking with minimum hydraulic losses.

It is a further object of the invention to provide a gear system including a hydrodynamic transmission during starting and braking and direct mechanical gearing during normal running.

It is a further object of the invention to provide a power transmission in a gear system employing a hydrodynamic brake operative to couple torque to an output shaft during starting and to absorb torque during braking.

It is a further object of the invention to provide a power transmission and a gear system employing a bi-directional retarder for coupling power to, and absorbing power from, an output shaft during acceleration and braking respectively.

According to the invention, a change-over device in the planetary gear system reverses the direction of rotation of a third gear component and with it the direction of the retarder rotor, while the direction of rotation of the output shaft remains the same. The retarder has a high specific output in both directions of rotation. The retarder is thus effective for hydrodynamic braking, after its direction of rotation has been reversed, as well as for hydrodynamic power transmission during low speed acceleration. The retarder is switched on and off by filling and draining it respectively. Advantageously, a control device may be provided responsive to a braking command generator (e.g. a brake pedal) and an acceleration generator (e.g. accelerator pedal) to proportionately control the retarder torque.

A retarder which is effective in both directions of rotation can have one single toroidal chamber if the impellers lie in axis-parallel planes. However, a retarder such as described in German DE-PS No. 1,600,191 is preferred, in which impellers are set obliquely in two toroidal working chambers. Spatially and functionally, the working chambers merge closely with each other. Thus, only a single common rotor is required. In addition, the use of closely related chambers permits both the working chambers to be jointly filled or drained. Thus, the cost for control of the working fluid is considerably less than would be the case if both a converter and a retarder were required.

The gear system of the drive unit according to the invention has a hydrodynamic starting speed range in which the retarder is switched on, and a mechanical range with at least two gears. In first gear, the third gear component and thus the retarder rotor are stopped. The second gear is connected in by operating the switching device which initiates reversing the direction of the retarder rotor. Preferably, this switching device is a through-coupling which connects the input and output shafts of the gear system to each other.

The drive unit according to the invention can be completed by the addition of many kinds of gear systems. There may be a gear system with only additional forward gears, or with forward gears and at least one reverse gear, or a simple reversing gear system may be used. Thus, as many gears as required can be used. However, embodiments without additional gear systems are possible, as will be explained later.

An advantage of the invention is that, when accelerating the output shaft from a standstill, the retarder needs to be switched on over a smaller speed range than is true with hydrodynamic torque converters. When the relatively low minimum output speed (minimum travel speed) has been attained, the brake can lock the third gear component. Thereafter, the gear system operates purely mechanically in second gear, without hydraulic losses. As a result, the consumption of energy is relatively low, taken over the entire operating range.

Although omitting a hydrodynamic torque converter prevents taking advantage of its high torque conversion, in many instances such as, for example, in a transmission for an omnibus, high torque conversion is not required, since acceleration should be limited to a level which does not disturb passengers.

The retarder in the present invention is effective during hydrodynamic braking quite independently of the drive motor, over a wide range of output shaft speeds. When the through-coupling is connected, retarder braking can be used only down to the lowest permissible speed of the drive motor. For this reason, and since the through-coupling is generally necessary for traction operation, where necessary the through-coupling can be combined with an input switching coupling which can also include a brake.

The drive unit according to the invention is adaptable to many different types of drive motors. Use with a diesel engine is preferred, but use with a gas turbine is also possible. A reversible drive motor such as an electric motor offers additional interesting possibilities.

When used with a reversing motor, the present invention permits omitting a reversing gear since the retarder is substantially independent of the direction of rotation and works equally well in both input directions during traction operation. Similarly, the retarder can brake equally well in both output directions. An electric motor with the retarder and the associated set of planetary wheels may provide all the gearing required in some electric vehicles, such as in trolley-buses and further gears may be dispensed with.

During the starting up process, the speed of the drive motor should not be reduced too far by the retarder. Otherwise, the motor may stall. In addition, the motor speed should not be permitted to reach an excessive value such as might occur if the throttle is opened wide when the retarder torque is relatively low. One solution is a manual control of the level of working fluid, and thus the torque of the retarder, according to the speed of the drive motor. In the present invention, the level of the working fluid is automatically controlled during starting and braking. The speed of the drive motor may be permitted to increase with increasing travel speed. A linear or progressive dependence of the engine speed on the travel speed can be established. To adapt the gear system of the present invention to motors of different capacities requires only a change in the control for filling the retarder. This can be done particularly simply by varying the characteristic of a required-value generator in the control system thus establishing a specific relationship between the speed of the engine and the travel speed. In contrast, to adapt a torque converter to different motors requires changing converter pump impellers and/or toothed wheels for various input translations.

If required, the two working chambers of the retarder can provide different amounts of maximum torque in the two directions. For example. the working chambers may have different dimensions, or they can contain impellers having different angles of inclination. This also makes it possible to adapt the retarder to different maximum speeds in the two directions of rotation.

According to an aspect of the present invention, there is provided a gear system of the type having a planetary gear and a retarder having a rotor, comprising an input shaft, an output shaft, a first gear component connected to the input shaft, a second gear component connected to the output shaft, a third gear component connected to the rotor, a brake effective to stop the third gear component, means for interconnecting the first, second and third gear components to produce a first direction of rotation of the first component and a second different direction of rotation of the third gear component when the output shaft is stationary, the means for interconnecting being further effective to urge the output shaft in the first direction of rotation when a braking torque is applied to the third gear component by the retarder, means for shifting the gearing to rotate the third gear component in the first direction at a speed of the output shaft greater than a predetermined minimum speed, and means in the retarder for producing a high specific output in both the first and the second directions of rotation.

According to a feature of the present invention, there is provided a gear control system for a gear system which includes a retarder having a rotor, comprising an input shaft, an output shaft, a first gear component connected to the input shaft, a second gear component connected to the output shaft, a third gear component connected to the rotor, means for coupling the first, second and third gear components effective for rotating the first and third gear components in first and second opposite directions when the second gear component rotates at a speed below a predetermined value, torque from the retarder being effective to urge the output shaft to rotate in the first direction, a brake effective for locking the rotor whereby a first mechanical gear is achieved, a through-coupling between the input shaft and the second gear component, the through-coupling being effective to rotate the first, second and third gear components in the first direction at an equal speed, means for controlling a working fluid in the retarder to a level effective to maintain a speed of the input shaft at a first predetermined value regardless of an accelerator signal setting when a speed of the output shaft is below a second predetermined value, and the means for controlling being further effective to control the working fluid in the retarder to a level related to a braking signal.

According to a further feature of the present invention, there is provided a method of controlling a gear system of the type which includes a retarder having a rotor, an input shaft, an output shaft, a first gear component connected to the input shaft, a second gear component connected to the output shaft, and a third gear component connected to the rotor, comprising coupling the first, second and third gear components for rotating the first and third gear components in first and second opposite directions when the second gear component rotates at a speed below a predetermined value, torque from the retarder urging the output shaft to rotate in the first direction, locking the rotor to achieve a first mechanical gear, coupling the input shaft and the second gear component to rotate the first, second and third gear components in the first direction at an equal speed to achieve a second mechanical gear, controlling a working fluid in the retarder to a level effective to maintain a speed of the input shaft at a first predetermined value regardless of an accelerator signal setting when a speed of the output shaft is below a second predetermined value, and controlling the working fluid in the retarder to a level related to a braking signal.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The use of bar diagrams employed in the descriptions which follows are a well known representation of planetary gear systems. A complete explanation of the use of bar diagrams is to be found in a publication, Automobiltechnische Zeitschrift 1967, pages 149–152, herein incorporated by reference.

Figure 1:
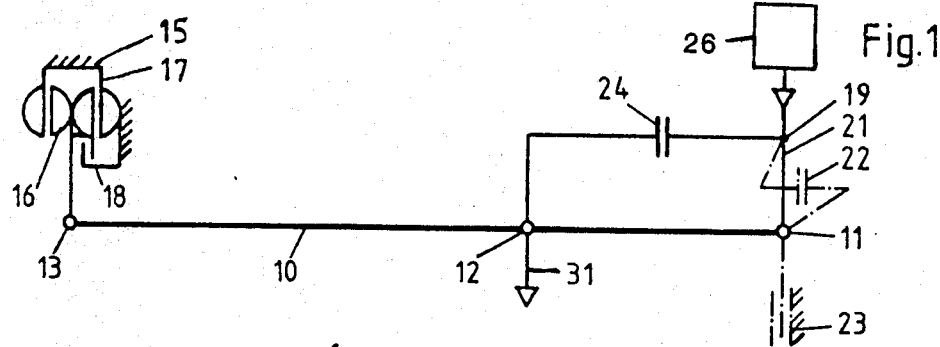
FIG. 1 is a bar diagram to which reference will be made in explaining the gear system.

Referring now to FIG. 1, a planetary gear is represented having three gear components, indicated as points 11, 12 and 13 on a bar 10. Points 11, 12 and 13 are hereinafter identified as first, second and third gear components respectively. An input shaft 21 rigidly connects a drive motor 20 to first gear component 11. Alternatively, this rigid connection may be replaced by a releasable coupling 22. If releasable coupling is used, a brake 23 is included on first gear component 11.

Second gear component 12, in the middle of bar 10, is rigidly connected to output shaft 31. A releasable through-coupling 24 is connected between input shaft 21 and output shaft 31. Instead of this, a coupling (not shown) could also be arranged between first and third gear components 11 and 13, or between second and third gear components 12 and 13. A further variation may include omitting coupling 22 and substituting a coupling (not shown) between drive motor 20 and branching point 19, to which through-coupling 24 is connected.

A retarder 15, which is a type of hydrodynamic brake, is effective in both rotary directions as disclosed in German Patent Specification No. 1,600,191. A rotor 16 on retarder 15 includes two circles of impellers and a stator 17, which also includes two circles of impellers. Retarder rotor 16 is connected rigidly to third gear component 13. Retarder rotor 16 may be stopped by a mechanical brake 18.

Figure 2:
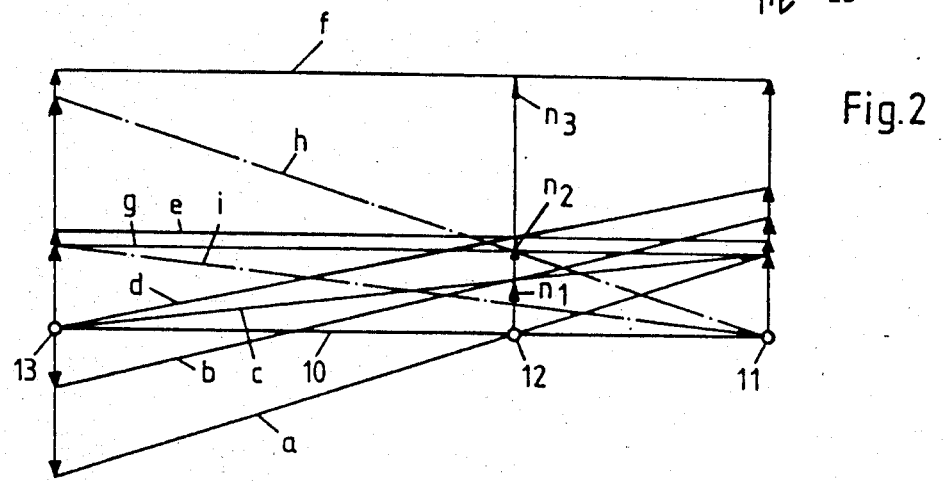
FIG. 2 is a speed diagram related to the bar diagram of FIG. 1.

A speed diagram corresponding to bar 10 from FIG. 1 with the three gear components 11 to 13 is shown in FIG. 2. Arrows extending upward from point 11 represent speeds of input shaft 21. Similarly, the arrows extending upward from points 12 and 13 represent speeds of output shaft 31 and retarder rotor 16 respectively.

A diagonal line a indicates the speed relationships during idling with output shaft 31 stationary. Input shaft 21 rotates at a mimimum rotary speed, retarder rotor 16 rotates in the opposite direction at a rotary speed which is higher by the gear ratio of the system in this condition.

A line b indicates the speed relationships in which retarder is operative and the speed of drive motor 20 and input shaft 21 are increased for starting the vehicle. This reduces the speed of third gear component 13 to approximately one-third of its original idling speed. Accordingly, output shaft 31 is accelerated to rotate at a speed $n_1$.

A line c shows the speed relationships after brake 18 is closed, thereby engaging the first mechanical gear. This reduces the speed of input shaft 21 for a given speed $n_1$ of output shaft 31 to approximately the original minimum idling speed. With further acceleration, the output speed increases to a value $n_2$, and the input speed correspondingly increases as indicated by a line d.

If through-coupling 24 is now closed, all gear components 11, 12 and 13 rotate at the same speed and in the same direction at, for example, a speed $n_2$, as indicated by a line e. The second mechanical gear is thereby engaged. After further acceleration to the maximum output speed $n_3$, the speed relationships are given in a horizontal line f.

In the second mechanical gear described above, retarder 15 may be switched on to brake the vehicle. The speed of output shaft 31 can decrease at most to horizontal line g which represents the minimum speed permitted for input shaft 21. Retarder 15 rotates in the reverse direction, compared with its direction when starting up.

Improved braking at low travel speeds can be achieved with retarder 15 when coupling 22 and brake 23 are provided, as shown in FIG. 1. In this case, retarder 15 is effective between dashed lines h and i, with coupling 22 released and brake 23 switched on. Through-coupling 24 must be opened not later than when the speed of output shaft 31 drops below the minimum speed permitted for input shaft 21.

Figure 3:
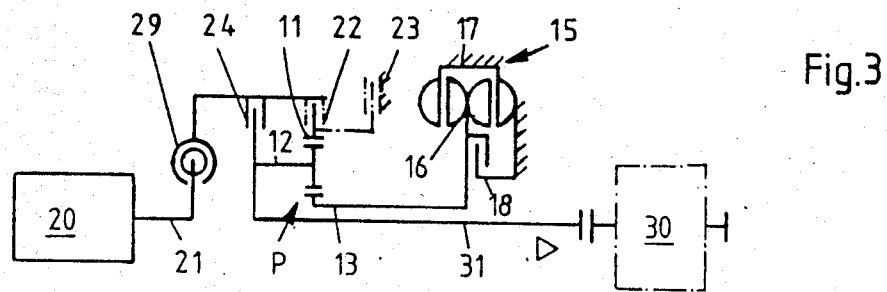
FIG. 3 is a schematic view of a planetary gear system which can be derived from FIGS. 1 and 2.

Referring now to FIG. 3, a preferred embodiment of the invention is shown, including a simple set P of planetary wheels. Drive motor 20, input shaft 21, output shaft 31 and retarder 15 can again be seen. First gear component 11 of set P of planetary wheels is an annular wheel which can be connected to input shaft 21 either directly or through coupling 22 shown in dot-dashed line. In the latter case, first gear component 11 can be stopped by brake 23. A torsion oscillation damper 29 may be included between input shaft 21 and set P of planetary wheels. Second gear component 12 of the set of planetary wheels P is a satellite carrier, whiich is rigidly connected to output shaft 31. Through-coupling 24 is connected between output shaft 31 and input shaft 21. Third gear component 13 is a sun wheel which is rigidly connected to retarder rotor 16 and can be stopped by brake 18. Subsequent gearing 30 can be connected to output shaft 31.

Figure 4:
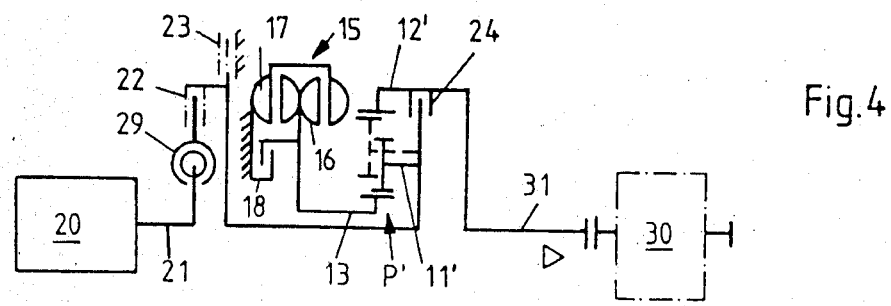
FIG. 4 is a schematic view of another planetary gear system which can be derived from FIGS. 1 and 2.

Referring now to a further embodiment of the invention in FIG. 4, parts which remain unchanged from those in FIG. 3 are given the same reference symbols. Planetary gearing P' includes double planet wheels. First gear component 11' is a satellite carrier and second gear component 12' is an annular wheel. Third gear component 13 is a sun wheel, as in FIG. 3. The operation of the embodiment in FIG. 4 corresponds to the operation of the embodiment in FIG. 3.

Figure 5:
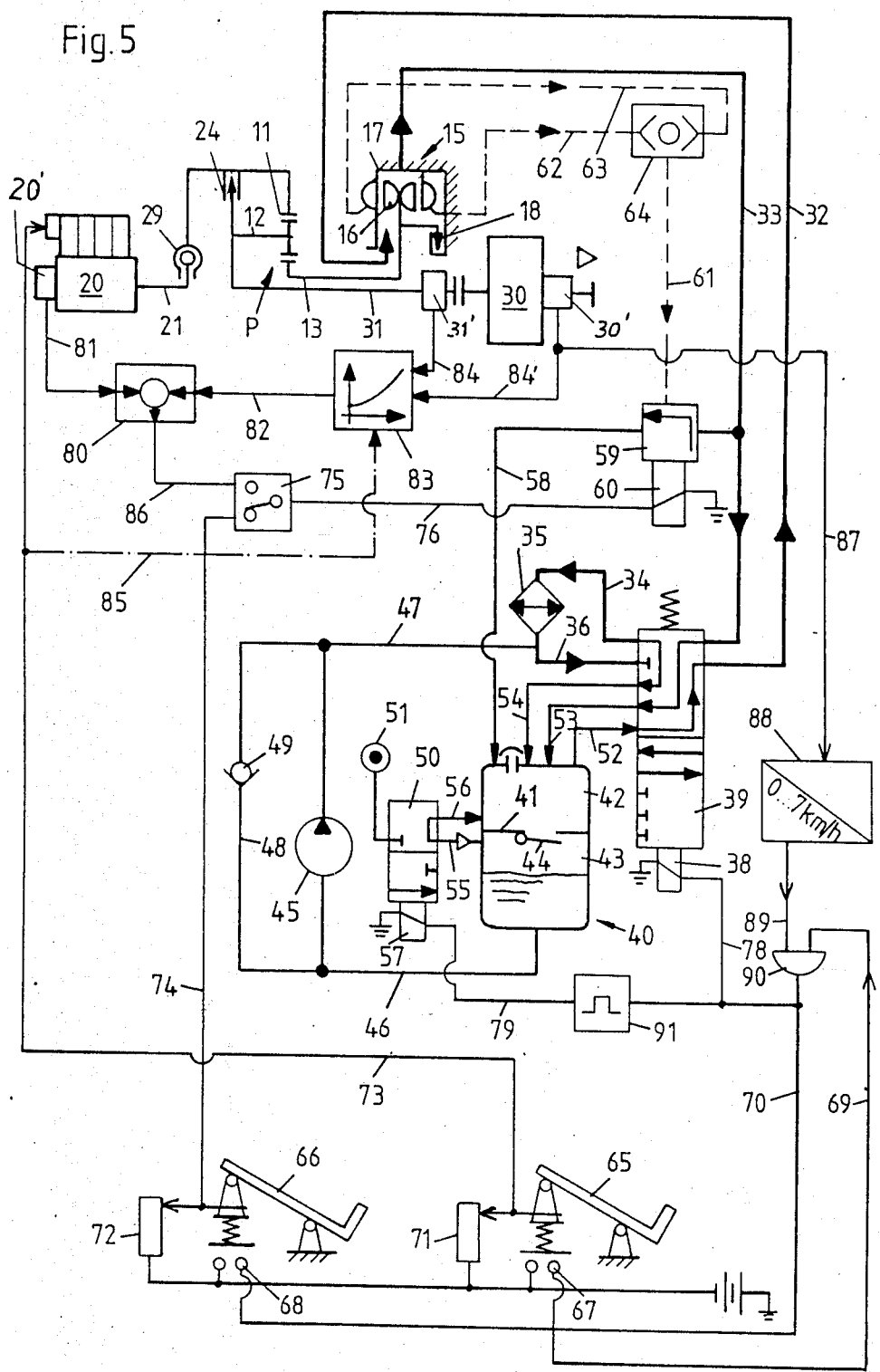
FIG. 5 is a schematic diagram of a control system for operation of the retarder of FIGS. 1, 3 and 4.

Referring now to FIG. 5, a control system is shown for retarder 15 of the embodiment of the invention shown in FIG. 3. Individual parts of the gear system in FIG. 5 are designated by the same reference numerals as in FIG. 3. Working fluid for retarder 15 is connected through a supply line 32 and a return line 33 which are both connected to a switching valve 39. A cooler 35 is connected to switching valve 39 by an inlet line 34 and an outlet line 36. A fluid container 40 is divided by a partition 41 into an upper collecting portion 42 and a lower supply container 43.

Switching valve 39 is shown in its rest position in which it connects retarder supply line 32 to a venting line 52 and return line 33 to a draining line. Switching valve 39 also connects cooler inlet line 34 to draining line 54 and shuts off cooler outlet line 36. Lines 52, 53 and 54 are connected to upper collecting portion 42. Retarder 15 is switched off in this state.

In its operating position (initiated, for example, by energization of an electromagnet 38) switching valve 39 connects cooler outlet line 36 to supply line 32 and return line 33 to cooler inlet line 34. A filling pump 45 pumps working fluid through an extraction line 46 from lower supply container 43 into a filling line 47 which opens into cooler outlet line 36.

In order to obtain quick response of retarder 15 to a "switch on" command, supply container 43 is loaded with compressed air. A flap valve 44 closes an opening between sections 42 and 43 of the container in response to a positive pressure in lower supply container 43. Retarder cooling circuit 32 to 36 is rapidly filled by air-pressure-forced fluid through by-pass line 48, non-return valve 49 and filling line 47. Compressed air is controlled by valve 50, shown in its rest position. In its operating position, valve 50 connects a compressed air source 51 to a pressure line 55 which opens into lower supply container 43. In the rest position, it equalizes the pressure in fluid container 40 by connecting pressure line 55 from lower supply container 43 through an unloading line 56 to upper collecting portion 42. An electromagnet 57 actuates valve 50 briefly upon a "switch on" command for the retarder, to provide compressed air in lower supply container 43 for a short time. At the end of the short time, valve 50 is returned to its deactivated condition and filling pump 45 keeps retarder cooling circuit 32 to 36 filled and pressurized. Non-return valve 49 prevents reverse bypass flow of fluid.

The level to which retarder 15 is filled is controlled by an outlet control valve 59. Outlet control valve 59 connects return line 33 to a draining line 58 which opens into upper collecting portion 42. Outlet control valve 59 controls the filling of retarder 15 to a value which matches the retarder moment with a variable required value. Two forces oppose each other in outlet control valve 59. One force, representing a required value, is a smoothly varying magnetic force from an electromagnet 60. The other force, representing the feedback or actual value of hydraulic pressure in retarder 15, is a hydraulic pressure supplied to outlet control valve 59 on a line 61. The hydraulic pressure is taken, via one of measuring lines 62 or 63 (shown in dashed line) from the one of the two working chambers of retarder 15 which is active (according to the direction of rotation). A double non-return valve 64 connects the one of measuring line 62 and measuring line 63 having the higher pressure to line 61.

A "switch on" command for retarder 15 can be produced by actuation of either accelerator 65 or brake pedal 66. Each of these pedals 65 and 66 has an electrical contact 67 or 68 which is closed when its pedal is slightly pressed. "Switch on" signal lines 69 and 70 respectively are connected to the contacts. A potentiometer 71 or 72 respectively (or some other motion pick-up) can also be displaced by either of the pedals. Potentiometer 71 of accelerator pedal 65 is connected via a control line 73 to the output regulator of drive motor 20 (equivalent to a mechanical linkage). Potentiometer 72 forms directly the electrical required value for the braking torque to be produced by retarder 15. This required value is supplied, via a control line 74, a switching element 75 and a control line 76, to electromagnet 60 of outlet regulating valve 59.

Pressing brake pedal 66 produces a signal on line 70 which energizes switching valve 39 and thus switches it into its operating position. Switching valve 39 remains in its operating position for as long as brake pedal 66 is maintained pressed. A pulse generator 91 such as, for example, a monostable multivibrator, is triggered by the signal on line 70 to produce a single, short duration-pulse which is applied on a line 79 to electromagnet 57 to switch compressed air valve 50 into its operating position and to maintain it in that condition for only a short time. The resulting flow of working fluid into retarder 15 produces a braking torque, with the magnitude of the braking torque depending on how far braking pedal 66 is pressed down.

During starting, the torque which sould be contributed by retarder 15 depends on the speed of drive motor 20, the actual speed of output shaft 31 and the setting of accelerator 65 indicating the desired acceleration. A signal proportional to the actual speed of output shaft 31 measured, for example, by a tachometer 31', is applied on a line 84 to a required value generator 83. The desired acceleration signal from accelerator potentiometer 71 is applied on a line 85 to required value generator 84. Optionally, to provide improved resolution, a further or substitute actual speed signal generated, for example, by a tachometer 30' on an output of subsequent gearing 30, may be applied on a line 84' to required value generator 83. Based on its inputs, required value generator 83 applies a signal on a line 82 to an input of a regulating device 80. A motor speed signal produced, for example, by a tachometer 20' connected to drive motor 20, is applied on a line 81 to a second input of regulating device 80.

Regulating device 80 produces an adjustment value related to the difference between the required value and the actual value of retarder torque. The adjustment value is applied on a line 86 to an input of switching element 75 and also forms a required value for outlet control valve 59. Switching element 75 operates similarly on its input signals as does a double non-return valve such as valve 64 on its pressure inputs. That is, switching element 75 applies to its output the one of its inputs having a greater amplitude. This output is a required value signal applied on a line 76 to electromagnet 60 for proportional actuation of outlet control valve 59.

The use of retarder 15 during acceleration is reserved for low speeds below a limit value of about 7 kilometers per hour for example. Above this speed, retarder 15 is drained and direct mechanical drive established by closing brake 18 is relied on. A limit value generator 88 receives a speed signal on a line 87 from tachometer 30'. At speeds below the limit value, limit value generator 88 applies an enable signal on a line 89 to one input of an AND gate 90. At speeds higher than the limit value, limit value generator 88 inhibits AND gate 90. The second input of AND gate 90 receives a signal on a line 69 from accelerator electrical contact 67. AND gate 90 is thus enabled to energize electromagnets 38 and 57 to thereby provide working fluid to retarder 15 during acceleration only when the vehicle speed is less than the limit value.

When starting up from a standstill and below the limit value speed, the torque produced by retarder 15 is controlled by regulating device 80 to a value which permits the speed of drive motor 20 to approach the predetermined required value determined by required value generator 83. For example, if an excessively high retarder torque reduces the speed of drive motor 20 below the speed specified by required value generator 83 regulating device 80 reduces the magnetic force on electromagnet 60. This permits partial draining of retarder 15 through outlet valve 59, and a consequent reduction in retarder torque to thereby permit the speed of drive motor 20 to increase. If the output speed of subsequent gearing 30 increases beyond the limit value set by limit value generator 88, an inhibit signal applied on line 89 to AND gate 90 removes the energizing signal from electromagnet 38. Switching valve 39 returns to its rest position and retarder 15 is drained. Simultaneously, the first mechanical gear is engaged by closing brake 18. The control of brake 18 and through-coupling 24 is effected in a conventional way for automatic gear systems. Since they are conventional, the devices required for these functions are omitted from the drawing.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. In a drive unit comprising:
an input shaft adapted for connection to a drive motor;
an output shaft adapted for connection to an element being driven;
a retarder having a rotor;
a brake for stopping said rotor;
a planetary gear system comprising:
a first gear component connected to said input shaft;
a second gear component connected to said output shaft; and
a third gear component connected to said rotor, wherein said first, second, and third gear components are interconnected so that said first gear component rotates in a first direction and said third gear component rotates in a second opposite direction when said output shaft is stationary, said output shaft being caused to rotate in said first direction when the rotation of said third gear component is slowed by aid of said retarder;
coupling means adapted to releasably connect said input and output shaft when said output shaft rotates above a predetermined minimum speed, wherein said coupling means, when actuated, causes said third gear component to rotate in said first direction; the improvement comprising:
(a) the third gear component being continuously connected to said rotor;
(b) a first speed achieved by engaging said brake;
(c) said retarder being adapted to produce a high braking torque in said first direction of rotation as well as in said second direction of rotation substantially independent of the direction of rotation of said rotor; and
(d) the drive unit further comprising:
a braking command generator;
an acceleration command generator; and
means for engaging said retarder responsive to signals from either said braking command generator or said acceleration command generator.

2. A drive unit according to claim 1, further comprising:
means for controlling the torque of said retarder responsive to signals from either said braking command generator or said acceleration command generator.

3. A drive unit according to claim 2, wherein said means for engaging said retarder includes means for sensing the speed of said output shaft and producing a signal indicative thereof and means for applying said signal to engage said retarder.

4. A drive unit according to claim 1, further including means for controlling the torque of said retarder responsive to at least one of a speed of said input shaft, a speed of said output shaft, a braking command signal, and an acceleration command signal for varying a level of working fluid in said retarder to vary its torque.

5. A drive unit according to claim 2, wherein said coupling means includes a through-coupling effective to lock together said first, second, and third gear components.

6. A drive unit according to claim 1, further including: a coupling between said input shaft and said first gear component and a brake effective to stop said first gear component.

7. A drive unit according to claim 1, further comprising means for controllably filling working fluid in said retarder to a level which keeps retarder torque at a value that controls the speed of said input shaft at a requried value depending on the speed of the output shaft.

8. A drive unit according to claim 7, wherein said means for controllably filling working fluid in said retarder includes means for determining the difference between a required value of the speed of said input shaft and an actual speed and producing a signal indicative of said difference and means for controllably filling working fluid in response to said signal.

9. A drive unit according to claim 1, wherein said means for determining a difference includes a required value generator, said required value generator being effective to produce said required value in response to a speed of said output shaft.

10. A drive unit according to claim 9, wherein said required value generator is responsive to an increase in said speed of said output shaft to increase said required value.

11. A drive unit according to claim 1, wherein said retarder is adapted to produce a different braking torque in said first and second directions.

12. A drive unit comprising:
a retarder having a rotor;
an input shaft;
an output shaft;
a planetary gear system comprising:
a first gear component connected to said input shaft;
a second gear component connected to said output shaft;
a third gear component continuously connected to said rotor;
means for coupling said first, second, and third gear components effective for rotating said first gear component in a first direction and said third gear component and said rotor in a second opposite direction when said second gear component rotates at a speed below a first predetermined value with braking torque from said retarder being effective to urge said output shaft to rotate in said first direction;
a mechanical brake effective for locking said rotor whereby a first speed is acheived;
a through-coupling between said input shaft and said second gear component, said through-coupling being effective to rotate said first, second, and third gear components and said rotor in said first direction at an equal speed; and
a first means for controllably filling working fluid in said retarder to a level effective to maintain the speed of said input shaft at a second predetermined value regardless of an accelerator signal setting, said first means for controlling being effective when the speed of said output shaft is below said first predetermined value; and
second means for controllably filling working fluid in said retarder to a level related to a braking signal.

13. A method of controlling a gear system of the type which includes a retarder having a rotor, an input shaft, an output shaft, a planetary gear system comprising a first gear component connected to said input shaft, a second gear component connected to said output shaft, and a third gear component continuously connected to said rotor, said method comprising:
coupling said first, second, and third gear components for rotating said first gear component in a first direction and for rotating said third gear component and said rotor in a second opposite direction when said second gear component rotates at a speed below a predetermined value with a braking torque from said retarder urging said output shaft to rotate in said first direction;
locking said rotor with a mechanical brake to achieve a first speed;
coupling said input shaft and said second gear component to rotate said first, second, and third gear components and said rotor in said first direction at an equal speed to achieve a second mechanical gear; and
controllably filling working fluid in said retarder effective to mainta in said input shaft at a first predetermined speed regardless of an accelerator signal when said output shaft is below a second predetermined speed or of a braking signal.

* * * * *

UNITED STATES PATENT AND TRADEMARK OFFICE
CERTIFICATE OF CORRECTION

PATENT NO. : 4,699,022

DATED : October 13, 1987

INVENTOR(S) : Stadt et al.

It is certified that error appears in the above—identified patent and that said Letters Patent is hereby corrected as shown below: On The Title Page:

On the cover page, after: "[21] Appl No.: 852,372" insert the following:

--[30]  Foreign Application Priority Data

December 11, 1981  Federal Republic of Germany
       P 31 44 902.6.--

Signed and Sealed this

First Day of November, 1988

Attest:

DONALD J. QUIGG

Attesting Officer

Commissioner of Patents and Trademarks